(12) United States Patent
Brudniok

(10) Patent No.: US 10,391,644 B2
(45) Date of Patent: Aug. 27, 2019

(54) ROBOT WITH A FORCE MEASURING DEVICE

(71) Applicant: KUKA Deutschland GmbH, Augsburg (DE)

(72) Inventor: Sven Brudniok, Langerringen (DE)

(73) Assignee: KUKA Deutschland GmbH, Augsburg (DE)

( * ) Notice: Subject to any disclaimer, the term of this patent is extended or adjusted under 35 U.S.C. 154(b) by 89 days.

(21) Appl. No.: 15/747,603

(22) PCT Filed: Jul. 19, 2016

(86) PCT No.: PCT/EP2016/067213
§ 371 (c)(1),
(2) Date: Jan. 25, 2018

(87) PCT Pub. No.: WO2017/016939
PCT Pub. Date: Feb. 2, 2017

(65) Prior Publication Data
US 2018/0215054 A1  Aug. 2, 2018

(30) Foreign Application Priority Data

Jul. 27, 2015 (DE) ........................ 10 2015 214 170

(51) Int. Cl.
*B25J 19/00* (2006.01)
*B25J 19/02* (2006.01)
(Continued)

(52) U.S. Cl.
CPC ............. *B25J 19/02* (2013.01); *B25J 13/085* (2013.01); *B25J 17/0283* (2013.01); *B25J 18/00* (2013.01);
(Continued)

(58) Field of Classification Search
CPC ........ B25J 19/02; B25J 17/0283; B25J 18/00; B25J 19/063; Y10S 901/09; Y10S 901/29; Y10S 901/46
(Continued)

(56) References Cited

U.S. PATENT DOCUMENTS 4,447,048 A    5/1984  Fischer
5,581,166 A *  12/1996 Eismann .................... B25J 9/04
                                                  318/568.18
(Continued)

FOREIGN PATENT DOCUMENTS

DE    2826131 A1    1/1979
DE    2841284 A1    4/1980
(Continued)

OTHER PUBLICATIONS

European Patent Office; Search Report and Written Opinion in International Patent Application No. PCT/EP2016/067213 dated Oct. 18, 2016; 13 pages.
(Continued)

*Primary Examiner* — Max H Noori
(74) *Attorney, Agent, or Firm* — Dorton & Willis, LLP

(57) ABSTRACT

A robot includes a robot controller that is designed and configured to execute a robot program, and a robot arm having at least three joints connected by links and a number of drives corresponding to the at least three joints. Each drive is designed to adjust one of the at least three joints allocated to the drive. The joints can be actuated in an automated manner in accordance with the robot program or in a manual drive mode by the robot controller to automatically adjust the associated joint, wherein at least one of the links includes a force measuring device designed to measure a force on the link in a predetermined direction.

23 Claims, 20 Drawing Sheets

(51) Int. Cl.
*B25J 18/00* (2006.01)
*B25J 19/06* (2006.01)
*B25J 13/08* (2006.01)
*B25J 17/02* (2006.01)

(52) U.S. Cl.
CPC ............ *B25J 19/063* (2013.01); *Y10S 901/09* (2013.01); *Y10S 901/29* (2013.01); *Y10S 901/46* (2013.01)

(58) Field of Classification Search
USPC ....................................................... 73/862.08
See application file for complete search history.

(56) References Cited

U.S. PATENT DOCUMENTS

| | | | |
|---|---|---|---|
| 5,909,938 A | 6/1999 | Brenner et al. | |
| 2011/0126660 A1 | 6/2011 | Lauzier et al. | |
| 2012/0048027 A1 | 3/2012 | Hashiguchi et al. | |
| 2015/0081098 A1* | 3/2015 | Kogan | B25J 9/1656 700/258 |
| 2015/0277426 A1* | 10/2015 | Ogata | B25J 9/1694 700/253 |
| 2016/0221188 A1* | 8/2016 | Nagai | B25J 9/1612 |
| 2017/0007336 A1* | 1/2017 | Tsuboi | B25J 9/1674 |
| 2017/0014998 A1* | 1/2017 | Langenfeld | B25J 9/1638 |
| 2017/0113346 A1* | 4/2017 | Nagata | B25J 9/1633 |

FOREIGN PATENT DOCUMENTS

| | | |
|---|---|---|
| DE | 69402444 T2 | 11/1997 |
| DE | 10223670 A1 | 12/2003 |
| DE | 102007026299 A1 | 12/2008 |
| DE | 102010003697 A1 | 10/2011 |
| DE | 202013105036 U1 | 2/2015 |
| EP | 1353159 A2 | 10/2003 |
| GB | 2060204 A | 4/1981 |
| JP | 2010131676 A | 6/2010 |
| JP | 2013121625 A | 6/2013 |

OTHER PUBLICATIONS

German Patent Office; Office Action in related German Patent Application No. 10 2015 214 170.5 dated Aug. 1, 2016; 5 pages.

* cited by examiner

ROBOT WITH A FORCE MEASURING DEVICE

CROSS-REFERENCE

This application is a national phase application under 35 U.S.C. § 371 of International Patent Application No. PCT/EP2016/067213, filed Jul. 19, 2016 (pending), which claims the benefit of German Patent Application No. DE 10 2015 214 170.5 filed Jul. 27, 2015, the disclosures of which are incorporated by reference herein in their entirety.

TECHNICAL FIELD

The invention relates to a robot, comprising a robot controller, which is designed and configured to execute a robot program, and comprising a robot arm with at least three joints, which are connected by links, and comprising a number of drives corresponding to the at least three joints, of which each drive is designed to adjust a joint of the at least three joints allocated to said drive, and can be actuated by the robot controller automatically in accordance with the robot program or in a manual drive mode, in order to automatically adjust the associated joint.

BACKGROUND

A robot, comprising an arm, a first load sensor, which contains a piezoelectric body, the natural frequency of which is higher than the natural frequency of the structural material of which the arm is constructed, and one or more actuators which are provided in the arm in order to drive the arm, wherein a sensor fixing device, which is provided in a base of the actuator within the actuators in the arm, which is closest to a base end of the robot arm, and wherein the first load sensor is provided in the sensor fixing device, is known from US 2012/0048027 A1.

EP 1 353 159 A2 discloses a torque sensor in the form of a monolithic disc-shaped receiving part, consisting of an annular inner flange with first force introduction points, an annular outer flange with second force introduction points and radially extending connecting webs formed between the two flanges, each with a mechanically weakened section on which pressure or strain-sensitive measuring sensors generating electrical output signals are provided, which, according to the principle of a Wheatstone bridge, are respectively connected to quarter, half or full bridges in such a way that a torque can be determined, characterized in that the receiving part comprises a continuous, structured, flat upper side, and the mechanically weakened sections of the connecting webs are formed as recesses on the underside, each with a thin membrane-like closure, wherein measuring sensors are attached to the flat planar upper side of the membrane-like closures.

SUMMARY

The object of the invention is to create a robot, in which the robot arm can be positioned in a particularly precise manner by measuring forces occurring inside the robot arm.

This object is inventively solved by a robot, comprising a robot controller, which is designed and configured to execute a robot program, and comprising a robot arm with at least three joints, which are connected by links, and comprising a number of drives corresponding to the at least three joints, of which each drive is designed to adjust a joint of the at least three joints allocated to said drive, and can be actuated by the robot controller automatically in accordance with the robot program or in a manual drive mode, in order to automatically adjust the associated joint, wherein at least one of the joints comprises:

a force measuring device, which is designed to measure a force on the link in a predetermined direction, a first structural component, which is connected to a joint of the robot arm mounted in the kinematic joint chain of the robot arm directly in front of the link, a second structural component, which is connected to a joint of the robot arm mounted in the kinematic joint chain of the robot arm directly behind the link, and a bearing arrangement, which connects the first structural component to the second structural component and is designed to rigidly connect the first structural component to the second structural component leaving only one degree of freedom, wherein the one degree of freedom of the bearing is designed to permit mobility only in the direction in which the force measuring device is configured to measure the force.

Robot arms with associated robot controllers, in particular industrial robots, are work machines, which can be equipped with tools for the automatic handling and/or processing of objects and can be programmed in a plurality of movement axes, for example with respect to orientation, position and workflow. Industrial robots typically comprise a robot arm with a plurality of links connected via joints and programmable robot controllers (control systems), which automatically control or regulate the movement sequences of the robot arm during operation. The links are moved, in particular with respect to the axes of movement of the industrial robot, which represent the degrees of freedom of movement of the joints, by means of drives, in particular electric drives which are controlled by the robot controller.

The robot can, for example, be an industrial robot, which can in particular be an articulated robot with rotational axes, for example six rotational axes, which follow one another in series. The robot can alternatively be a SCARA robot, i.e. a horizontal jointed-arm robot, which generally comprises four degrees of freedom or axes, i.e. joints, of which three joints can be rotary joints and one joint is a prismatic joint. The robot can, however, also be a so-called lightweight robot, which can in particular comprise seven rotational axes, which follow one another in series. The robot can alternatively also be a SCARA robot, in particular a SCARA robot with six degrees of freedom.

The industrial robot can in particular be a redundant industrial robot, i.e. a robot arm which can be moved by means of a robot controller and comprises more manipulative degrees of freedom than are necessary to perform a task. The degree of redundancy is obtained from the difference between the number of degrees of freedom of the robot arm and the dimension of the event space, in which the task is to be solved. This can be a kinematic redundancy or a task-specific redundancy. For a kinematic redundancy, the number of kinematic degrees of freedom, generally the number of joints of the robot arm, is greater than the event space, which in a real environment, during a movement in the space, is formed by the three translational degrees of freedom and the three rotational degrees of freedom, i.e. by six degrees of freedom. A redundant industrial robot can therefore, for example, be a lightweight robot with seven joints, in particular seven rotary joints. For a task-specific redundancy, on the other hand, the dimension of the task is smaller than the number of kinematic degrees of freedom of the robot arm. This is the case for example, if, on its hand flange, the robot arm carries a screw driving tool that is rotatable about a tool drive axis, and one of the rotary joints of the robot arm is oriented along said tool drive axis.

Lightweight robots initially differ from conventional industrial robots in that they have a structural size that is favorable for human-machine cooperation and, at the same time, a load-bearing capacity that is relatively high in relation to their own weight. Lightweight robots can, in particular, also be operated in a force and/or torque-controlled manner, instead of only in a position-controlled manner, which makes human-robot cooperation, for example, safer. Such a safe human-machine cooperation can additionally be achieved in that inadvertent collisions of the robot arm with persons, for example, such as workers and fitters, can either be prevented, or at least softened in such a way that there is no harm to the persons/fitters.

Such a robot arm or such lightweight robot preferably exhibits more than six degrees of freedom, thus creating an overdetermined system, by means of which the same point in the space can be achieved in the same orientation in several, in particular even infinitely many, different poses of the robot arm. The lightweight robot can react to external forces in appropriate ways. Torque sensors, which can detect or measure torques and forces in a plurality of spatial directions and are respectively disposed at the joints, can be used to measure the forces. Alternatively or additionally, the external forces can also be estimated without sensors, for example on the basis of the measured motor currents of the drives at the joints of the lightweight robot. Possible control concepts are, for example, indirect force control by modeling the lightweight robot as mechanical resistance (impedance), or direct force control.

For a force and/or torque-controlled actuation of the joints of the robot arm, the joints of the robot arm can be parameterized with respect to their rigidity. In all designs, the force-controlled and/or torque-controlled actuation of drives of the robot arm can be effected by means of impedance control or admittance control. The robot controller can be configured to allow the robot arm to yield in a manner suitable for safe human-robot cooperation, in particular by means of impedance control or admittance control. In such a control of the ability to yield, a manual drive mode can also mean that the robot arm can be moved manually by a worker, i.e. the joints of the robot arm can be adjusted manually.

A SCARA robot can likewise have torque sensors, which can detect or measure torques and forces in a plurality of spatial directions, disposed on the joints. Alternatively or additionally, the external forces can be estimated in a SCARA robot as well, without the use of special torque sensor components, for example, only on the basis of the measured motor currents of the drives at the joints of the SCARA robot.

The fact that, in particular in addition to torque sensors in the joints of the robot, the robot on one link or on multiple links of the robot arm comprises an inventive, in particular separate, force measuring device, which is designed to measure a force on the link in a predetermined direction, allows a particularly precise determination of forces acting on the robot arm. Such a precise determination of forces is, in particular, to be carried out in such a way that the positioning accuracy of the robot arm is or remains particularly precise.

The invention is described in the following on the basis of an exemplary individual link of the robot arm. However, an inventive force measuring device according to one or more design variants as described can respectively be provided on two or more, in particular also on all the links of the robot arm.

In principle, such an inventive link is constructed in two parts, i.e. it comprises a first structural component, which can, for example, be a first housing half of the link of the robot arm, and it comprises a second structural component, which can, for example, be a second housing half of the link of the robot arm. The first structural component is arranged to be adjustable, at least to a small extent, i.e. at least in the magnitude of the adjustment path of the force measuring device, relative to the second structural component. Such an adjustable arrangement is achieved by mounting the first structural component to be adjustable with respect to the second structural component, i.e. either the first structural component is adjustably mounted on the second structural component, or the second structural component is adjustably mounted on the first structural component. The bearing arrangement according to the invention is included to provide this type of adjustability of the first structural component and the second structural component relative to one another.

The bearing arrangement comprises a single degree of freedom, i.e. the first structural component can be adjusted relative to the second structural component exclusively in the direction, in which the force measuring device is configured to measure the force. Such a direction can also be referred to as the force measuring direction. In all other directions, in particular in all other Cartesian spatial directions, the bearing arrangement connects the first structural component to the second structural component in a rigid manner. In the force measuring direction, i.e. in the direction in which the bearing arrangement comprises its single degree of freedom, an adjustment of the first structural component relative to the second structural component is possible, but only to such a small extent that the design-related adjustment path of the force measuring device can be utilized. The bearing arrangement can, in particular, be designed to prevent, i.e. not allow, an adjustment of the first structural component relative to the second structural component that exceeds the design-related adjustment path of the force measuring device. An adjustment of the bearing arrangement that exceeds the design-related adjustment path of the force measuring device can, for example, be prevented by end stops, which are disposed on the first structural component and/or on the second structural component, and designed to allow the structural component and the second structural component to abut against each other in a form-fitting manner when the maximum adjustment path of the force measuring device is reached or exceeded.

The force measuring device can be designed for a direct force measurement. The force measuring device can, in particular, be designed for a one-dimensional force measurement. The force measuring device can, however, also be formed by a torque measuring device. The force measuring device can, in particular, comprise a one or multidimensional force sensor and/or a one or multidimensional torque sensor.

For safety reasons, end stops can be provided, which prevent an uncontrolled, in particular too extensive, movement of the two structural parts relative to one another, for example in the event that a mechanical failure of the force measuring device should occur.

In a first design variant of end stops, for example in the case of a four-bar linkage arrangement of the bearing arrangement, the end stops can be disposed between a four-bar link, or a joint coupler or swing arm, of the four-bar linkage arrangement and the respective structural component. The parallel kinematics offer a variety of attachment points for the integration of end stops. The four-bar links, or the joint couplers or swing arms, can be configured in such a way that they collide with one of the structural components once a specific movement angle has been exceeded.

In a second design variant of end stops, the end stops can be disposed between the structural components. The structural components can be assembled in such a way that they collide with one another if the movement of the four-bar linkage exceeds a specific movement angle, as a result of which a further movement of the joint is prevented.

The link of the robot arm in question is thus configured in such a way that all directions of movement of the first structural component relative to the second structural component are blocked, except that direction in which, according to the application, i.e. according to specifications, a force is to be measured. The force measuring device according to the invention is disposed within the link, or disposed between the first structural component and the second structural component, in such a way that a force flow to be measured occurs along the degree of freedom of the bearing arrangement over the force measuring device. The actual adjustment path of the force measuring device, or an actual displacement path of the first structural component relative to the second structural component, is set as a function of the magnitude of a force to be measured in accordance with the rigidity of the force measuring device. The force measuring device can be a force sensor known per se to the person skilled in the art and/or a moment sensor, in particular a torque sensor. A torque sensor of this type can, for example, be configured as described in EP 1 353 159 A2.

The bearing arrangement can be designed to allow a displacement of the first structural component relative to the second structural component.

The bearing arrangement can be designed specifically to permit a displacement of the first structural component relative to the second structural component perpendicular to a straight line of the distance pointing in the kinematic joint chain of the robot arm from the upstream joint to the downstream joint.

A two-part link of the robot arm is created by means of the first structural component and the second structural component. The two structural components are connected via their own kinematics, i.e. a bearing arrangement. In the case of this embodiment, this bearing arrangement is designed to permit a displacement of the first structural component relative to the second structural component, which is at least approximately or even exactly perpendicular to a straight line of the distance pointing from the upstream joint to the downstream joint in the kinematic joint chain of the robot arm. In other words, the bearing arrangement, which comprises only one degree of freedom, is designed to move one of the structural components from a first position into a second position, in which the structural component is offset parallel to its first position. Such a parallel offset can be aligned parallel to a straight line of the distance, which straight line of the distance points from the joint mounted in front of the link of the bearing arrangement in the kinematic joint chain of the robot arm to the joint mounted behind it. The parallel offset can in particular occur in a direction perpendicular to the straight line of the distance.

In a design structurally reduced to the essential, the first structural component can thus be connected to the second structural component via two swing arms, which are arranged in parallel and can also be referred to as coupling rods. Each swing arm can comprise two opposite pivot bearings, each of which is designed, in a rotatable manner about a single degree of freedom, to connect the swing arm to the first structural component on the one hand and to the second structural component on the other hand. The two structural components and the two swing arms or coupling rods can thus form a four-bar linkage.

In a specific embodiment, the bearing arrangement can thus comprise a four-bar linkage, which comprises a first four-bar link with a first input joint and a first output joint, and a second four-bar link with a second input joint and a second output joint, wherein the first input joint and the second input joint is connected to the first structural component, and the first output joint and the second output joint is connected to the second structural component.

The first four-bar link can thus be a first swing arm or a first coupling rod. The second four-bar link can thus be a second swing arm or a second coupling rod.

In a kinematic chain of driven joints of the robot arm, the sequence of the joints, i.e. the axes proceeding from a fixed base, i.e. a base frame of the robot arm, which carries a first axis, for example, up to a hand flange of the robot arm, which carries a sixth or seventh axis, for example, can be referred to in ascending order. Therefore, a downstream joint in the kinematic chain can be closer to the hand flange of the robot arm than an upstream joint.

The first input joint of the four-bar linkage and the second input joint of the four-bar linkage can accordingly be connected to the upstream driven joint of the robot arm. The first output joint of the four-bar linkage and the second output joint of the four-bar linkage can thus be connected to the downstream driven joint of the robot arm.

Since the force measuring device measures the force that leads to a parallel offset of the two structural components, the bearing arrangement should be designed in such a way that the force is transmitted without friction or at most with low friction, that the force is transmitted without stick-slip behavior or at most with low stick-slip behavior, that the bearing arrangement itself does not generate any counter-torque or at most a low counter-torque, and that other loads on the support structure, i.e. the robot arm, in particular its links, such as a torsional moment, for example, do not jam the bearing arrangement.

The joints of the four-bar linkage can, for example, be materially integral and/or form-fitted joints, sliding bearings, or rolling bearings. With rolling bearings, it is possible to construct four-bar linkages that exhibit only minimal friction and can also be arranged in a torsionally rigid manner. This type of mounting is complex, however, and the joints must be aligned very well with respect to one another, so that there is no jamming of the kinematics. Due to the only very small rotation angles in these joints, rolling bearings are not the best choice. Sliding bearings exhibit pronounced stick-slip effects, and must be configured well to be able to absorb torsional moments in the structure, which change without play and can easily lead to jamming.

Therefore, according to the invention, the joints of the four-bar linkage, in particular the first input joint, the first output joint, the second input joint, and the second output joint, can be bending joints, which are designed to permit only a displacement of the first structural component relative to the second structural component perpendicular to the straight line of the distance pointing in the kinematic joint chain of the robot arm from the upstream joint to the downstream joint, and to prevent a rotation of the first structural component relative to the second structural component, in particular about a rotational axis extending parallel or at a right angle to the straight line of the distance.

The bending joints, which can comprise bending elements, can be configured in such a way that, on the one hand, they can be bent easily and, on the other hand, they have sufficient rigidity in the event of changing torsional loads. Bending elements as a bearing arrangement have the advantage that they do not exhibit stick-slip behavior upon deformation. Deformation requires a force or a torque that, during a measurement, is no longer seen by the force measuring device, i.e. the force sensor. This bending moment is known to be repeatable and can thus be taken into account during a calibration.

A rectangular arrangement of two flexure plate segments per support point, for example, enables a rigid mounting of the four-bar linkage with respect to torsional moments, for example, which act on the structure along the longitudinal axis thereof. If the swing arms, i.e. the first four-bar link and the second four-bar link, are enlarged in their longitudinal extensions, the friction, the counter moment and the stick-slip effects in the bearing are reduced. The reason for this is that, due to the acting external force, the torque on the bearings increases with the lever arm of the swing arm length. Furthermore, the rotation angle in the bearings decreases while the parallel offset remains constant.

Thus, the first four-bar link and the second four-bar link can each comprise a length in the longitudinal extension of the link of the robot arm, which is greater than the distance between the first structural component and the second structural component, within which distance the force measuring device, in particular a torque sensor and its mounting flange and/or lever is disposed.

A force measurement can be performed with the aid of a torque sensor, which is decoupled with respect to the transverse force resulting from the acting force and is guided, in a manner protected against jamming, in a four-bar kinematic system mounted with flexure plates. In this design, the bearing function is assumed by flexure plates. Since the bending angles are very small, there is virtually no movement of the rotational axis of the joints. In order to make the kinematics more rigid and reduce the impact of a torsional moment along the longitudinal axis, the bending lengths of the plate can be very short. Alternatively or additionally, the swing arms of the parallel kinematics, i.e. the coupling rods of the four-bar linkage, can be lengthened, i.e. larger than the construction space between the two structural components, so as to increase the bending moment on the flexure plate via the thus enlarged lever arm and to reduce the bending angle of the plates. In order to allow the length of the swing arms or the coupling rods to be greater than the distance between the sensor mounts, the swing arms can be disposed outside the structure. The force measuring device, in particular the sensor, is located within the four-bar linkage.

A force measurement can, however, also be performed with the aid of a torque sensor, which is decoupled with respect to the transverse force resulting from the acting force and is guided, in a manner protected against jamming, in a four-bar kinematic system mounted with deformation elements. The difference lies in the type of mounting of the four-bar linkage. A bearing bush is respectively located between the swing arm or the coupling rod and the structural components, and is connected to the swing arm and the structural part in a form-fitted manner. In the geometric arrangement of the surroundings, the used material can exhibit the property that normal forces are transmitted with very little deformation, and a small movement of the swing arm about the rotational axis is possible with a low counter-torque. During this rotation, there is no relative movement between bush and swing arm or structural component, which would otherwise be associated with stick-slip phenomena.

As an alternative to bending joints, mounting can also be carried out by means of thrust elements. To do this, a materially integral mounting can be provided, for example, in which a materially integral component is used, which is made of a material that transmits the normal forces without significant deformation, i.e. exhibits a high modulus of elasticity, and offers little resistance to shear forces, i.e. exhibits a low shear modulus. This type of mounting can be constructed in a cost-effective manner, and can absorb torsional moments in longitudinal direction without tilting.

In all the variants of the force measuring device with a torque sensor described in the following, the torque sensor can fundamentally, at least substantially or analogously, be configured in accordance with a torque sensor according to EP 1 353 159 A2.

In a first variant, the force measuring device can comprise a torque sensor, which includes an inner flange, an outer flange, and connecting webs, which connect the inner flange to the outer flange and are provided with measuring sensors, in particular strain measuring sensors, wherein the torque sensor comprises a lever, connected to the outer flange, which is connected to the second structural component, wherein the inner flange is connected to the first structural component.

In a second variant, the force measuring device can comprise a torque sensor, which includes an inner flange, an outer flange, and connecting webs, which connect the inner flange to the outer flange and are provided with measuring sensors, in particular strain measuring sensors, wherein the torque sensor comprises a lever, connected to the inner flange, which is connected to the second structural component, wherein the outer flange is connected to the first structural component.

In a third variant, the force measuring device can comprise a torque sensor, which includes an inner flange, an outer flange, and connecting webs, which connect the inner flange to the outer flange and are provided with measuring sensors, in particular strain measuring sensors, wherein the torque sensor comprises a lever, connected to the outer flange, which is connected to the first structural component, wherein the inner flange is connected to the second structural component.

In a fourth variant, the force measuring device can comprise a torque sensor, which includes an inner flange, an outer flange, and connecting webs, which connect the inner flange to the outer flange and are provided with measuring sensors, in particular strain measuring sensors, wherein the torque sensor comprises a lever, connected to the inner flange, which is connected to the first structural component, wherein the outer flange is connected to the second structural component.

In the described variants of the torque sensor, the one structural component can be moved relative to the other structural component parallel along a circular path via the two swing arms or coupling rods. The inner region of the torque sensor is mounted to the one structural component. A ring is located around the outer part of the torque sensor, to which a lever is attached, the end of which is held in the other structural component. This retaining connection allows a small movement of the lever along its longitudinal axis. If the one structural component is held and a force acts on the other structural component, which comprises one component in the direction of movement of the parallel kinematics, the outer ring of the torque sensor experiences a torque vis-à-vis its inner ring. This torque corresponds to the force in the direction of movement multiplied by the distance between the center point of the torque sensor and the center point of the mount of the lever.

In such an embodiment, therefore, the torque sensor is constructed in such a way that it contains two connections, by means of which the torque, with which they are braced against each other about a defined axis, can be measured. The torque sensor is integrated in such a way that one connection of the torque sensor is connected to the one structural component and the other connection of the torque sensor rests against the other structural component via a lever. A displacement of the two structural components relative to one another by a force causes a torsion of the torque sensor about the defined axis. This torsion generates a counter-torque in the torque sensor that can be measured, and by means of which the force can be determined on the basis of the lever length.

In general, in all corresponding designs, the lever can comprise a pin, in particular a ball head pin, which engages in a recess, in particular an elongated hole or square hole of a joint rod, which is connected to the first structural component, and the lever comprises a pin, in particular a ball head pin, which in particular has a first stop toward the top and a second stop toward the bottom, which engages in a recess, in particular an opening of a joint rod, which comprises a third stop toward the top and a fourth stop toward the bottom and is connected to the second structural component.

In a modified embodiment, the inner flange of the torque sensor can be connected to an intermediate segment, which, on the one hand, is coupled to the first structural component via a first four-bar linkage and, on the other hand, is coupled to the second structural component via a second four-bar linkage, wherein the outer flange comprises two levers, of which one lever is connected to the first structural component, and the other lever is connected to the second structural component.

A force measurement can be performed with the aid of a torque sensor, which is decoupled with respect to the transverse force resulting from the acting force. To decouple the torque sensor from the transverse force, which arises as a result of the acting force, the torque sensor can be arranged in a loaded manner by means of two symmetrical levers. In this case, for this purpose, the torque sensor is attached to an intermediate segment, which is mounted centrally between the two swing arms of the parallel kinematics in such a way that it is likewise moved in parallel. The support points of the one structural component, the other structural part, and the intermediate segment are located on each swing arm along one straight line. Because the force acts on two levers on the torque sensor, compared to the previous solution, the same torque can be obtained with two levers which are only half as long. The result of this is that, under the same boundary conditions, the maximum parallel offset is only half as large.

A force measurement can, however, also be performed with the aid of a torque sensor, which is decoupled with respect to the transverse force resulting from the acting force and is mounted in the kinematics, in a manner protected against jamming. In this case, the torque sensor is mounted in the intermediate segment with a connection. At its ends, which serve as a connection to the swing arms of the parallel kinematics, the intermediate segment comprises spherical tips. A component comprising two symmetrical levers of equal length, which end in a ball shape, is mounted on the other connection of the torque sensor. The spherical ends of the two levers, which are connected to a connection of the torque sensor, are respectively held in a connecting link in the one structural component and in the other structural component. The one connecting link fixes the ball end along the direction of the force to be measured. None of the other movement directions are restricted. This can be achieved by means of a rectangular recess, for example, which touches the ball only in the two blocked movement directions. The other ball end of the lever is held by a connecting link, which prevents all movement directions along the force to be measured and at right angles thereto. This can be effected by means of a bore, for example, in which the ball end of the lever is accommodated in a flush manner. The swing arms of the parallel kinematics can respectively comprise a bore, which, in the non-deflected state of the swing arms, are aligned with one another. The spherical ends of the intermediate segment are accommodated in these two bores in a flush manner. The intermediate segment and thus the torque sensor are hereby held on a straight line, along which the intermediate segment can move and about which the intermediate segment can rotate. Because of this mounting, the torque sensor does not experience any transverse forces resulting from the force to be measured and is not influenced by small deformations of the support structure resulting from external loads. In order to decouple the position of the support points for the torque sensor from the effects of torsional moments along the longitudinal axis of the support structure, said torque sensor is incorporated centrally in the support structure, which is axially symmetric with respect to the sensor. Due to the central alignment of the torque sensor in the structure, the support points of the spherical contact surfaces are located on neutral strands of the deformation caused by the torsion.

Alternatively or in addition to a torque sensor, the force measuring device can comprise a force sensor, which comprises a first sensor flange connected to the first structural component or to the second structural component, and comprises a second sensor flange connected to the first four-bar link or to the second four-bar link.

Alternatively or in addition to a torque sensor, the force measuring device can comprise a force sensor, which comprises a first sensor flange connected to the first structural component, and comprises a second sensor flange connected to the second structural component.

The force measuring device can comprise a force sensor, which comprises a first sensor flange, which is connected to the first structural component or the second structural component, and a second sensor flange, which is connected to the first four-bar link or to the second four-bar link, and the two sensor flanges can be designed to move in the measuring direction of the interposed force measuring device when a force is applied to the first structural component or the second structural component in measuring direction that results in a displacement of the first structural component and/or the second structural component in measuring direction.

The force measuring device can alternatively comprise a force sensor, which comprises a first sensor flange, which is connected to the first structural component, and a second sensor flange, which is connected to the second structural component, and the two sensor flanges can be designed to move in the measuring direction of the interposed force measuring device when a force is applied to the first structural component or the second structural component in measuring direction that results in a displacement of the first structural component and/or the second structural component in measuring direction.

The first four-bar linkage can comprise a first recess, which is square in cross-section with a pair of two respective opposite inner walls, and the intermediate segment comprises a first leg, which holds a first ball head, which is inserted in the first recess in such a way that the one pair of opposite inner walls guides the first ball head in a first direction and the other pair of opposite inner walls guides the first ball head in a second direction perpendicular to the first direction, the two directions being arranged perpendicular to the predetermined direction, in which the force measuring device measures the force on the link. Alternatively or additionally, the second four-bar linkage can comprise a second recess, which is square in cross-section with a pair of two respective opposite inner walls, and the intermediate segment comprises a second leg, which holds a second ball head, which is inserted in the second recess in such a way that the one pair of opposite inner walls guides the second ball head in a first direction and the other pair of opposite inner walls guides the second ball head in a second direction perpendicular to the first direction, the two directions being arranged perpendicular to the predetermined direction, in which the force measuring device measures the force on the link.

The force measuring device, in particular the torque sensor, can thus be mounted in a tension-free manner by means of the first lever, the second lever, the first leg and/or the second leg in such a way that an external force acting on the first structural component and/or the second structural component results exclusively in a torsional load on the force measuring device or torque sensor.

The force measuring device can comprise a torque sensor, which includes an inner flange, an outer flange, and connecting webs, which connect the inner flange to the outer flange and are provided with strain measuring sensors. Said torque sensor comprises a first lever, connected to the outer flange, which is connected to the first structural component, and a second lever, connected to the outer flange, which is connected to the second structural component.

The force measuring device can alternatively comprise a torque sensor, which includes an inner flange, an outer flange, and connecting webs, which connect the inner flange to the outer flange and are provided with strain measuring sensors. Said torque sensor comprises a first lever, connected to the inner flange, which is connected to the first structural component, and a second lever, connected to the outer flange, which is connected to the second structural component.

The first lever can comprise a pin, in particular a ball head pin, which engages in a recess, in particular a square hole or a bore in the first structural part or in a recess, in particular a square hole or a bore in a first joint rod, wherein the second lever comprises a pin, in particular a ball head pin, which engages in a recess, in particular a rectangular hole in the second structural part or in a recess, in particular a rectangular hole in a second joint rod.

The square hole or the bore thereby forms an obstruction for the pin or the ball head pin in four directions, for example in an x-direction toward the front and toward the rear, and in a y-direction toward the top and toward the bottom. The square hole or the bore thus form a two-value bearing for the pin or the ball head pin.

The rectangular hole thereby forms an obstruction for the pin or ball head pin in only two directions, for example only in a y-direction toward the top and toward the bottom. The rectangular hole thus forms a single-value bearing for the pin or the ball head pin.

The first lever can alternatively comprise a pin, in particular a ball head pin, which engages in a recess, in particular a square hole or the bore in the second structural part or in a recess, in particular a square hole or the bore in a second joint rod, wherein the second lever comprises a pin, in particular a ball head pin, which engages in a recess, in particular a rectangular hole in the first structural part or in a recess, in particular a rectangular hole in a first joint rod.

The square hole or the bore thereby forms an obstruction for the pin or the ball head pin in four directions, for example in an x-direction toward the front and toward the rear, and in a y-direction toward the top and toward the bottom. The square hole thus forms a two-value bearing for the pin or the ball head pin.

The rectangular hole thereby forms an obstruction for the pin or ball head pin in only two directions, for example only in a y-direction toward the top and toward the bottom. The rectangular hole thus forms a single-value bearing for the pin or the ball head pin.

In a common embodiment, the bearing arrangement and the force measuring device are formed by separate component arrangements. This means that all, or at least the essential, forces and torques transmitted between the first structural component and the second structural component are transmitted via the separate bearing arrangement. In a specific design variant, the bearing arrangement can generally also be formed by the force measuring device itself. This can mean that a part, an essential part, or all the forces and torques transmitted between the first structural component and the second structural component are transmitted via the force measuring device itself. The force measuring device can thus comprise a mounting flange, for example, which is rigidly connected to one structural component and comprises a lever, which projects into the other structural component and is fixed to said other structural component. The force measuring device can thus comprise the bearing arrangement, be it as a specially configured rotary or sliding bearing or in the form of spring sections, which can be formed on a base body of the force measuring device.

BRIEF DESCRIPTION OF THE DRAWINGS

Specific design examples of the invention are explained in greater detail in the following description with reference to the attached figures. Specific features of these design examples can represent general features of the invention, regardless of the specific context in which they are mentioned and, if applicable, also viewed individually or in other combinations.

DETAILED DESCRIPTION

Figure 1:
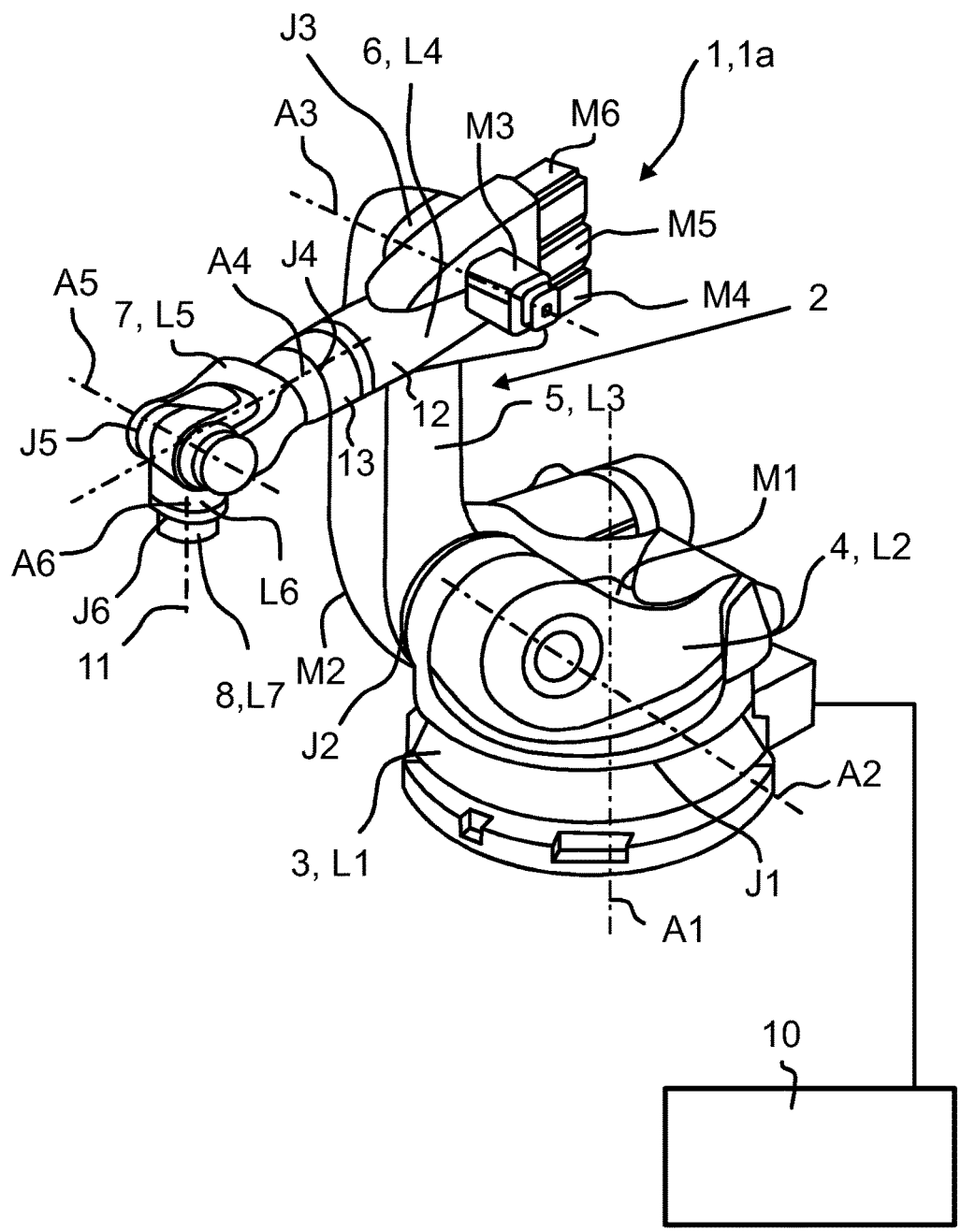
FIG. 1 is a perspective view of an industrial robot according to the invention in the form of a six-axis articulated robot.

FIG. 1 shows a robot 1, which comprises a robot arm 2 and a robot controller 10. In the case of the present design example, the robot arm 2 comprises several links L1 to L7, which are arranged one behind the other and rotatably connected to one another by means of joints J1 to J6.

The robot controller 10 of the robot 1 is designed and/or configured to execute a robot program, by means of which the joints J1 to J6 of the robot arm 2 can be adjusted and/or rotated in an automated manner according to the robot program or automatically in a manual drive mode. For this purpose, the robot controller 10 is connected to controllable electric drives M1 to M6, which are designed to adjust the joints J1 to J6 of the robot 1.

In the case of the present design example of an industrial robot 1a, the links L1 to L7 are in particular a frame 3 and a carousel 4 rotatably mounted about an axis A1 which extends vertically relative to the frame 3. Other links of the robot arm 2 are a swing arm 5, an arm extension 6, and a preferably multiaxial robot hand 7 with a fastening device configured as a flange 8 for mounting a tool 11. The swing arm 5 is mounted on the carousel 4 at the lower end, i.e. on the joint J2 of the swing arm 5, which can also be referred to as a pivot bearing head, so as to be pivotable about a preferably horizontal rotational axis A2.

At the upper end of the swing arm 5, on the first joint J3 of the swing arm 5, the arm extension 6 is in turn mounted to be pivotable about a likewise preferably horizontal axis A3. At its end, said extension arm holds the robot hand 7 with its preferably three axes of rotation A4, A5, A6. The joints J1 to J6 can respectively be driven via the robot controller 10 in a program-controlled manner by means of one of the electric drives M1 to M6. For this purpose, a gear mechanism can generally be provided between each of the links L1 to L7 and the respective associated electric drive M1 to M6. In the case of the design example shown in FIG. 1, representatively for each of the links L1 to L7, the link L4, for example, can comprise a first structural component 12 and a second structural component 13.

Figure 2:
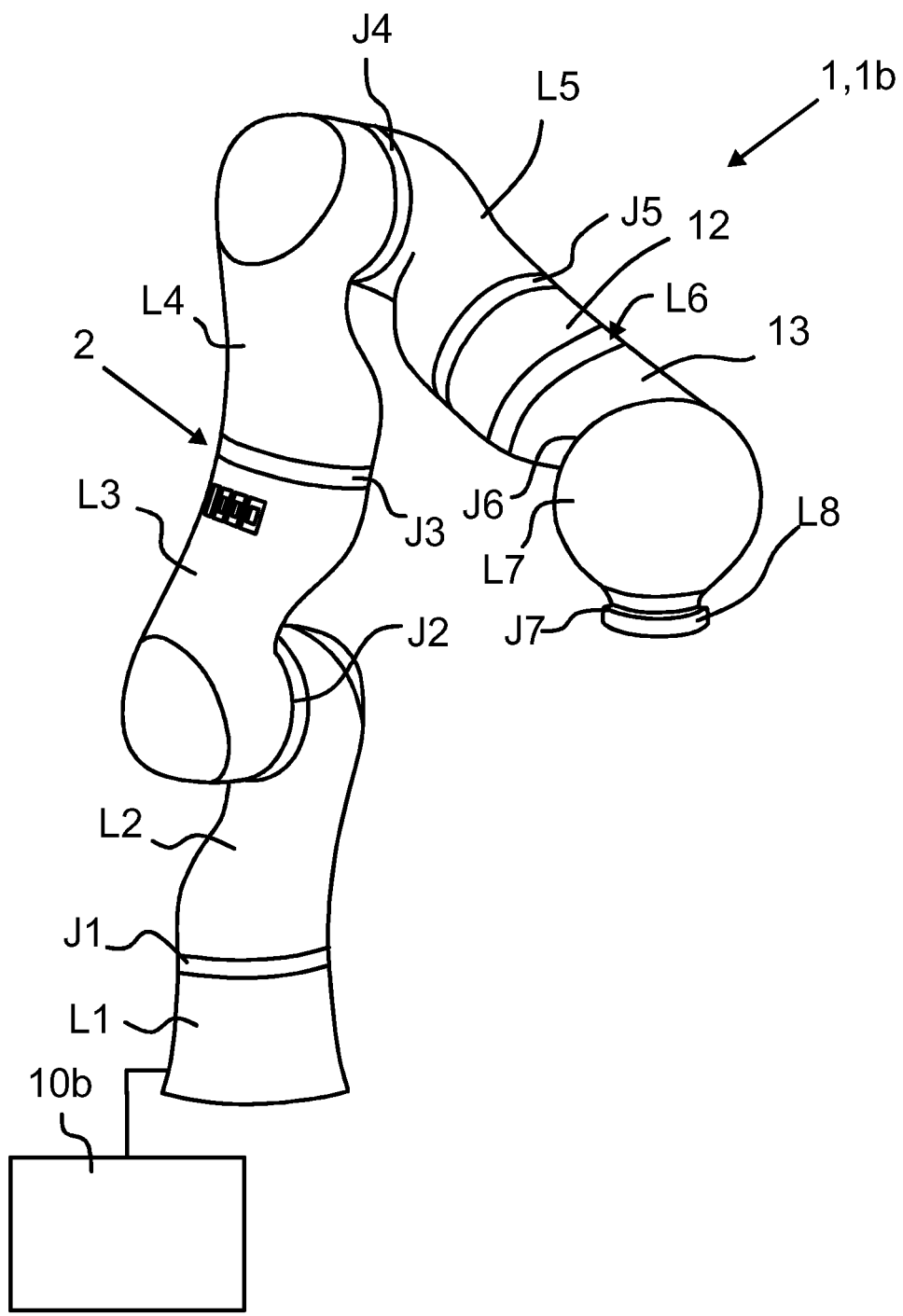
FIG. 2 is a perspective view of an industrial robot according to the invention in the form of a lightweight robot.

FIG. 2 shows a robot 1 in an exemplary design as a so-called lightweight robot 1b, which comprises a manipulator arm 2 and a robot controller 10b. In the case of the present design example, the manipulator arm 2 comprises eight links L1 to L8, which are arranged one behind the other and rotatably connected to one another by means of joints J1 to J7. In the case of the design example shown in FIG. 2, the link L6, for example, can comprise the first structural component 12 and the second structural component 13 in a representative manner for each of the links L1 to L8.

Figure 3:
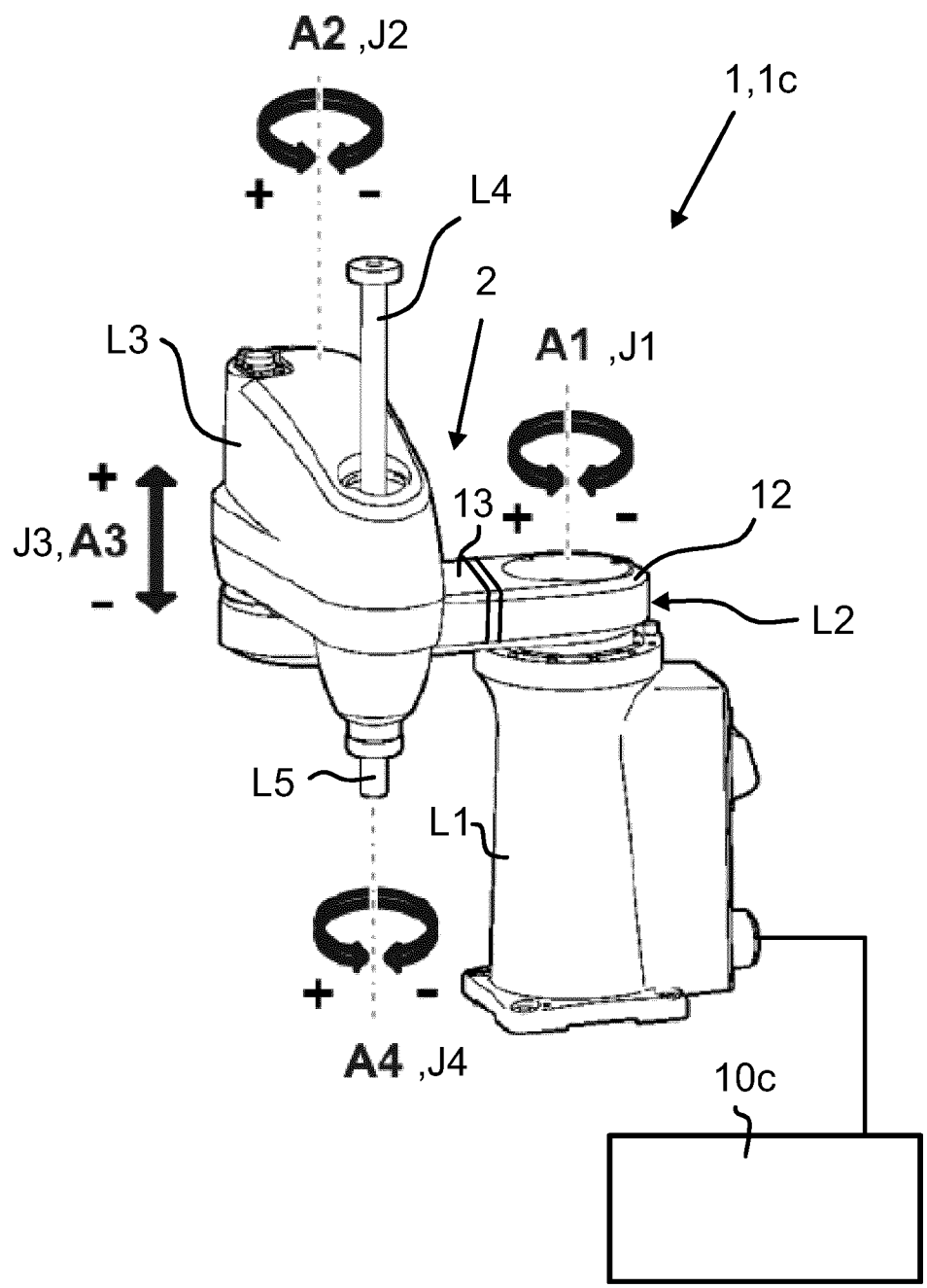
FIG. 3 is a perspective view of an industrial robot according to the invention in the form of a SCARA robot.

FIG. 3 shows a robot 1 in an exemplary design as a so-called SCARA robot 1c, which comprises a manipulator arm 2 and a robot controller 10c. In the case of the present design example, the manipulator arm 2 comprises five links L1 to L5, which are arranged one behind the other and rotatably connected to one another by means of joints J1 to J4. In the case of the design example shown in FIG. 3, the link L2, for example, can comprise the first structural component 12 and the second structural component 13 in a representative manner for each of the links L1 to L5.

Figure 4:
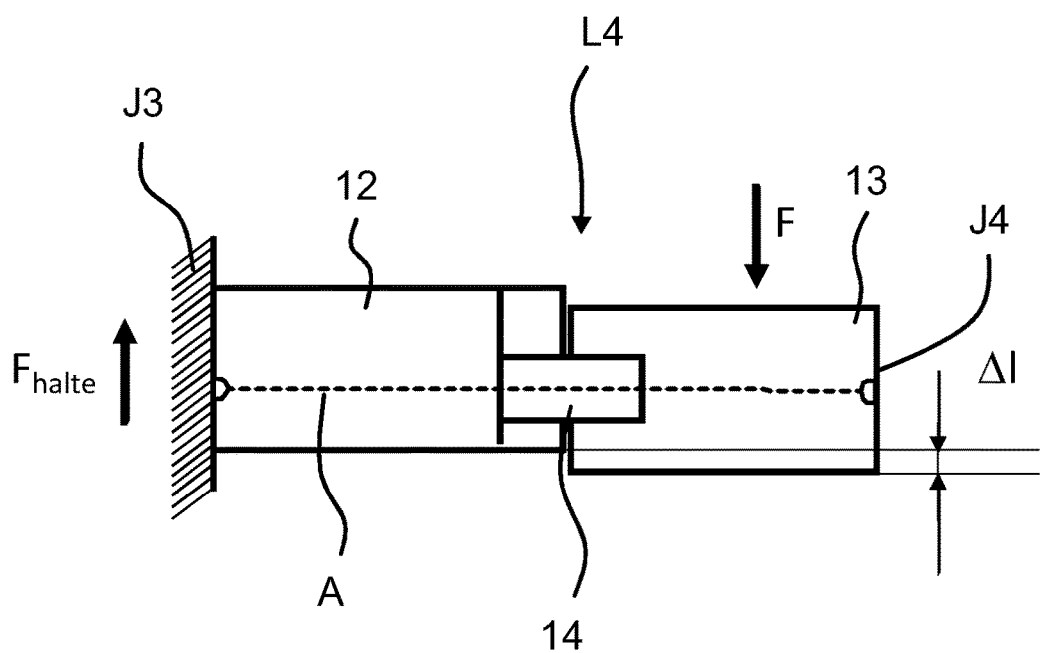
FIG. 4 is a schematic representation of a link of a robot arm with a first structural component, a second structural component and an associated force measuring device.

The link L4 shown schematically in FIG. 4 comprises the first structural component 12, the second structural component 13 and an associated force measuring device 14. To facilitate understanding, the first structural component 12 is shown in FIG. 4 as a fixed restraint, which can, however, correspond to a joint J3 mounted in the kinematic chain in front of the link L4. Accordingly, a force F acts on the second structural component 13 and is introduced, for example, via the joint J4, which is mounted in the kinematic chain behind the link L4.

The force measuring device 14 is designed to measure the force F on the link L4 in a predetermined direction, i.e. in this case along the adjustment path □l transverse to the straight line of the distance A from the upstream joint J3 to the downstream joint J4. The first structural component 12 is accordingly connected to the joint J3 of the robot arm 2, which is disposed in the kinematic joint chain of the robot arm 2 directly in front of the link L4. The second structural component 13 is accordingly connected to the joint J4 of the robot arm 2, which is disposed in the kinematic joint chain of the robot arm 2 directly behind the link L4.

Figure 5:
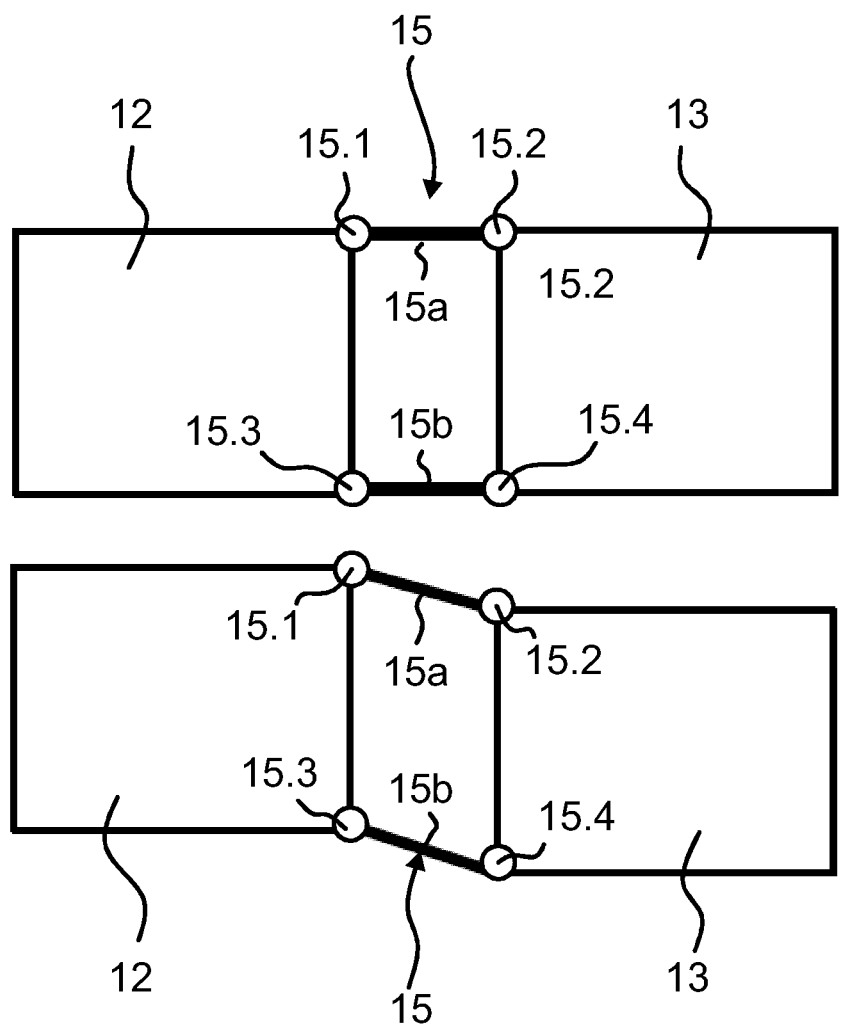
FIG. 5 is a schematic representation of a bearing arrangement connecting the first structural component to the second structural component, in the form of a four-bar linkage; at the top in a non-deflected configuration and at the bottom in a deflected configuration.

As shown schematically in FIG. 5, the first structural component 12 is connected to the second structural component 13 via a bearing arrangement 15, which is designed to connect the first structural component 12 to the second structural component 13 leaving only one degree of freedom of the bearing, but in an otherwise rigid manner, wherein the one degree of freedom of the bearing is designed to permit mobility only in the direction, in which the force measuring device 14 is configured to measure the force F.

The bearing arrangement 15 according to FIG. 4 to FIG. 20 is designed specifically to permit a displacement of the first structural component 12 relative to the second structural component 12 perpendicular to a straight line of the distance (A) pointing in the kinematic joint chain of the robot arm 2 from the upstream joint J3 (FIG. 4) to the downstream joint J4 (FIG. 4), i.e. in the direction of the adjustment path □I (FIG. 4).

In the case of the depicted design examples, the bearing arrangement 15 comprises a four-bar linkage, which comprises a first four-bar link 15a with a first input joint 15.1 and a first output joint 15.2, and a second four-bar link 15b with a second input joint 15.3 and a second output joint 15.4, wherein the first input joint 15.1 and the second input joint 15.3 is connected to the first structural component 12, and the first output joint 15.2 and the second output joint 15.4 is connected to the second structural component 13. The accordingly mounted segment is thus displaced substantially in the direction of force, but, due to the kinematics, is also displaced by a small amount perpendicular to the direction of force.

Figure 6:
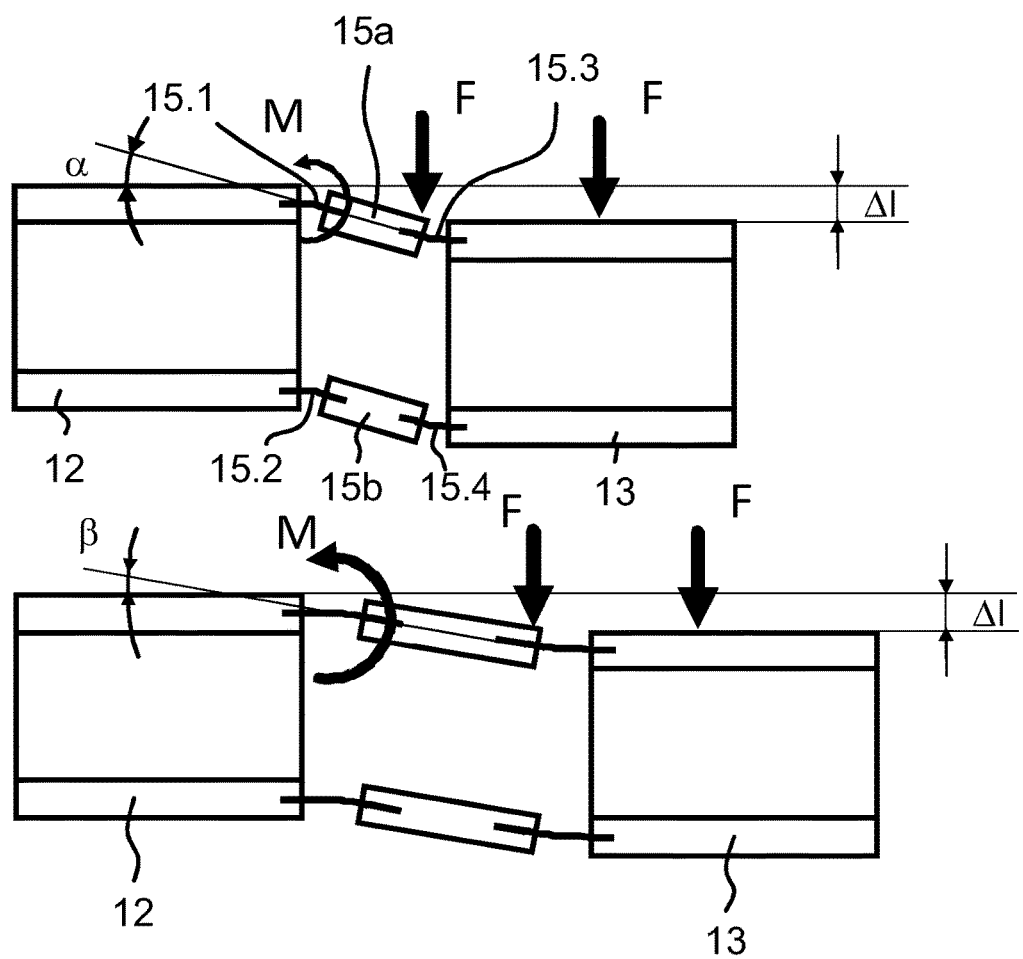
FIG. 6 is a schematic representation of two exemplary variants of bearing arrangements in the form of four-bar linkages with bending joints.

In the case of the design variant according to FIG. 6, the joints 15.1-15.4 of the four-bar linkage, in particular the first input joint 15.1, the first output joint 15.2, the second input joint 15.3, and the second output joint 15.4, are designed as bending joints, which permit only a displacement of the first structural component 12 relative to the second structural component 13 perpendicular to the straight line of the distance A pointing in the kinematic joint chain of the robot arm 2 from the upstream joint J3 to the downstream joint J4, wherein a rotation of the first structural component 12 relative to the second structural component 13, in particular about a rotational axis parallel to the straight line of the distance A, is prevented.

Figure 7:
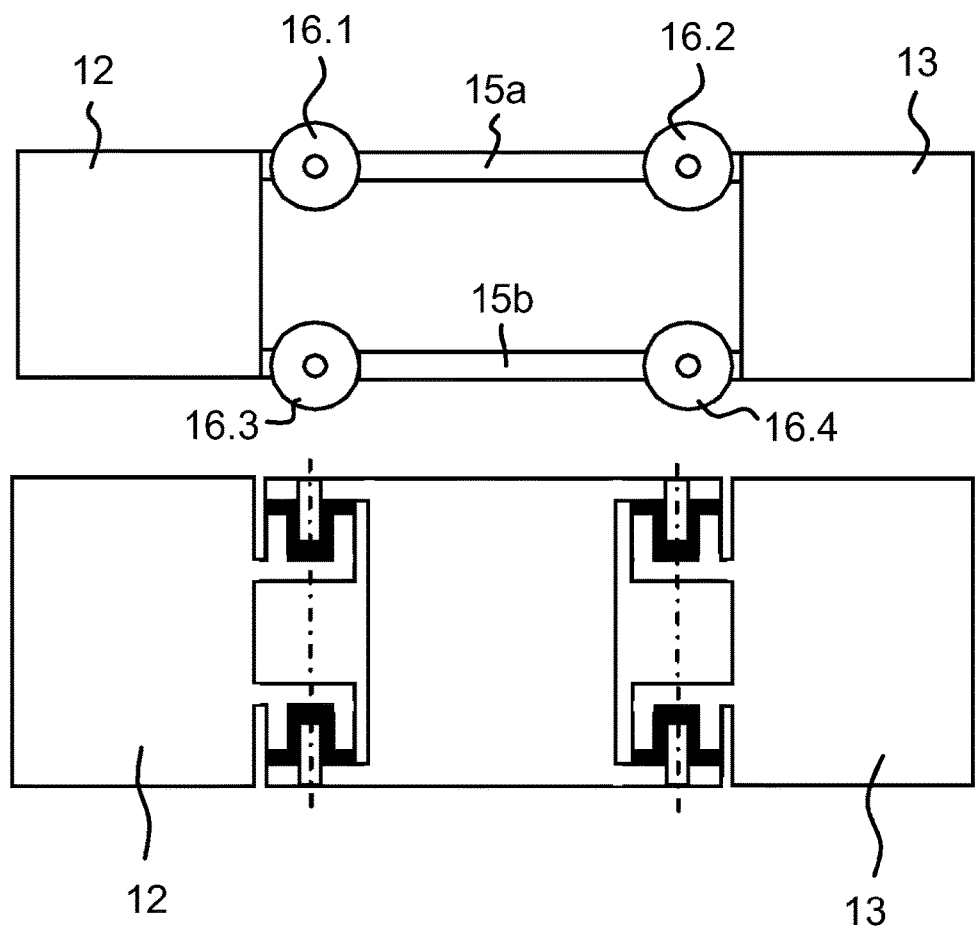
FIG. 7 is a schematic representation of an exemplary variant of an alternative bearing arrangement with thrust elements.
Figure 8:
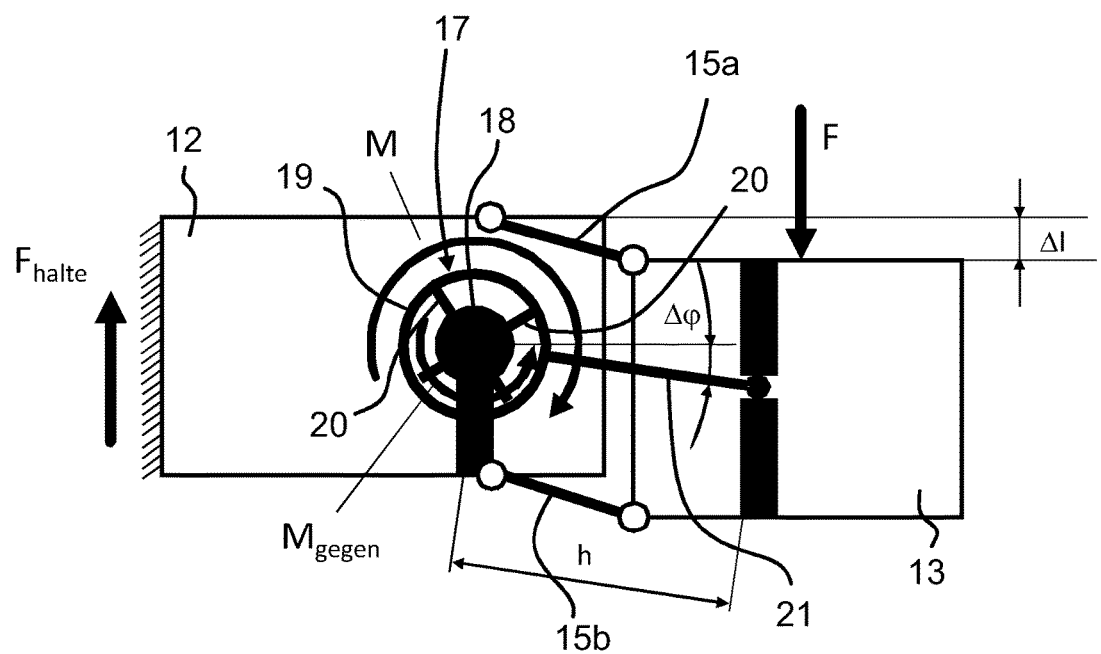
FIG. 8 is a schematic representation of the first structural component and the second structural component with a torque sensor.

FIG. 7 shows a schematic representation of an exemplary variant of an alternative bearing arrangement 15 with thrust elements 16.1 to 16.4.

FIG. 8 to FIG. 16 and FIG. 20 show variants in which the force measuring device 15 comprises a torque sensor 17, which comprises an inner flange 18, an outer flange 19 and connecting webs 20, which connect the inner flange 18 to the outer flange 19 and are provided with strain measuring sensors, wherein the torque sensor 17 comprises a lever 21, connected to the outer flange 19, which is connected to the second structural component 13.

Figure 9:
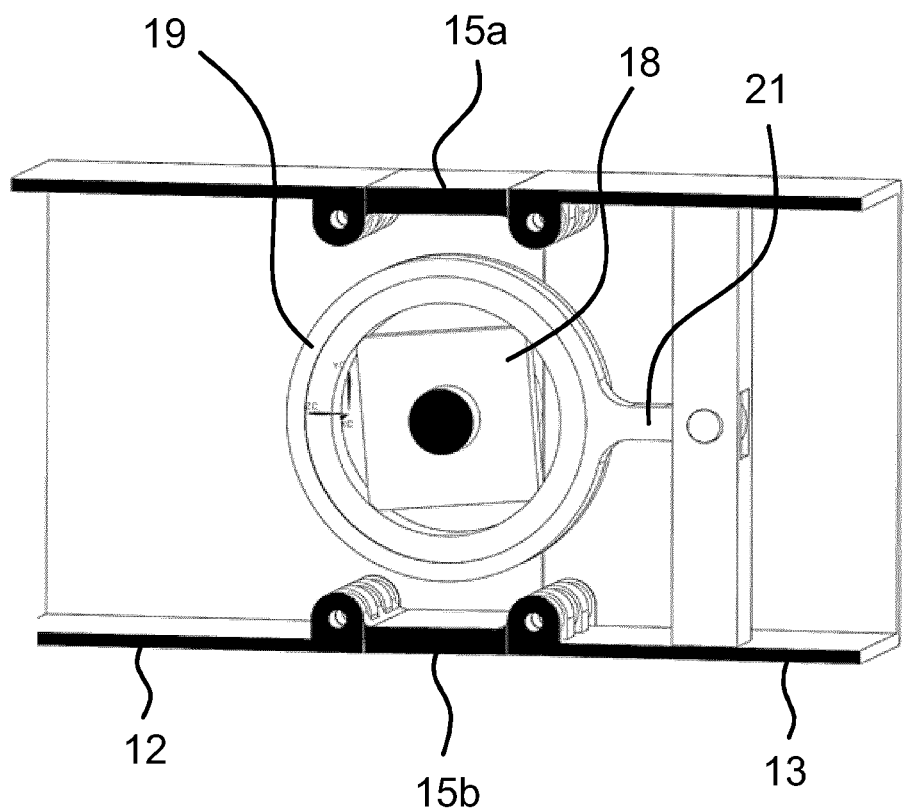
FIG. 9 is a perspective sectional view of the joint according to FIG. 8.

As shown in the variant according to FIG. 9, in the case of this design example, the inner flange 18 is connected to the first structural component 12.

Figure 10:
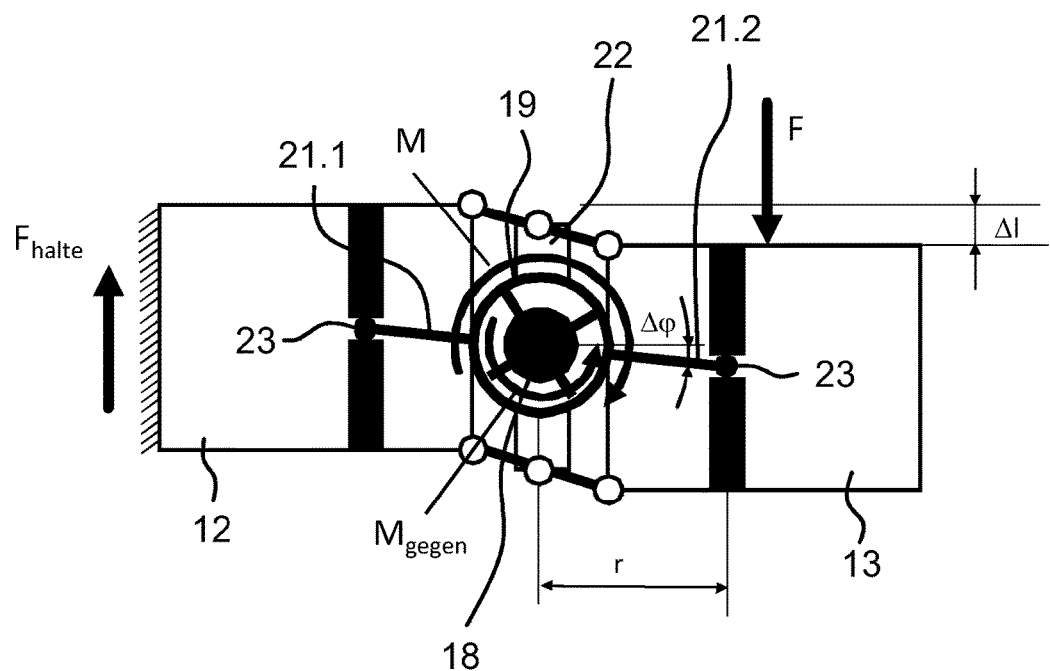
FIG. 10 is a schematic representation of the first structural component and the second structural component with a torque sensor and an intermediate segment.
Figure 11:
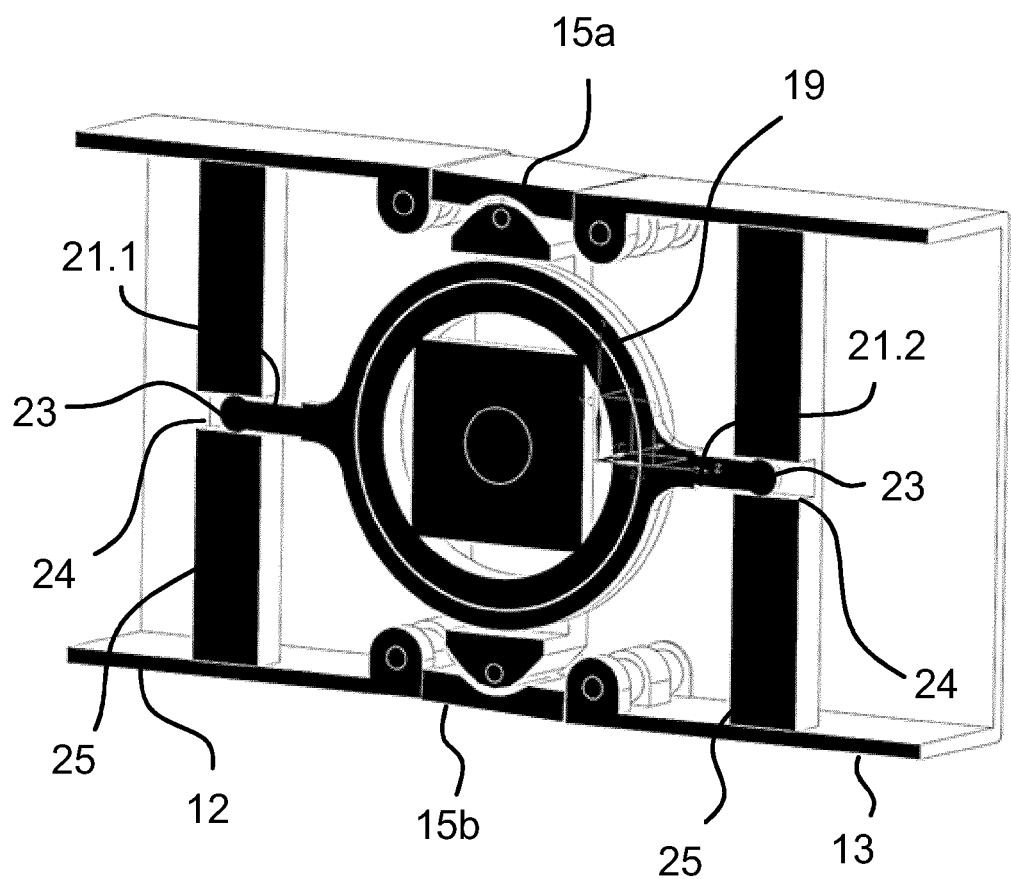
FIG. 11 is a perspective sectional view of the joint according to FIG. 10.
Figure 12:
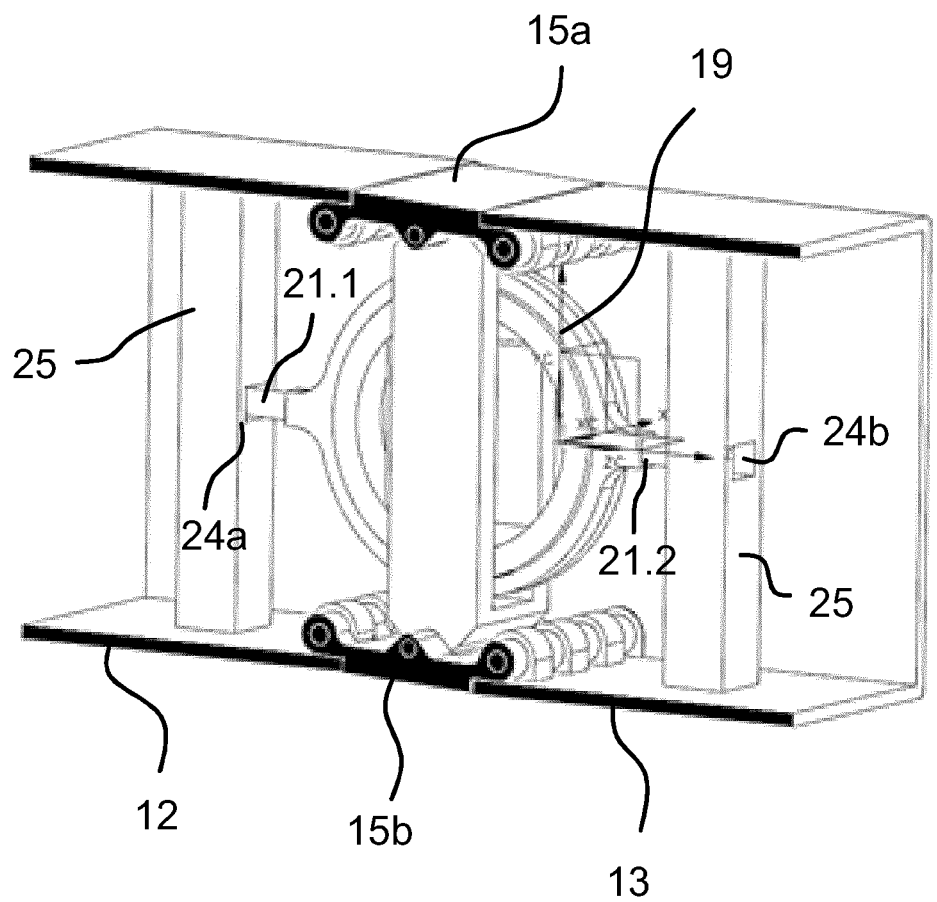
FIG. 12 is a perspective sectional view of a variant of a joint with a torque sensor, which is mounted in a manner in which it cannot get jammed.

FIG. 10 shows a variant, in which the inner flange 18 of the torque sensor 17 is connected to an intermediate segment 22, which, on the one hand, is coupled to the first structural component 12 via a first four-bar linkage and, on the other hand, is coupled to the second structural component 13 via a second four-bar linkage, wherein the outer flange 19 comprises two levers 21.1 and 21.2, of which one lever 21.1 is connected to the first structural component 12, and the other lever 21.2 is connected to the second structural component 13.

As shown in the variants according to FIG. 10 to FIG. 16, each lever 21.1, 21.2 can comprise a pin, in particular a ball head pin 23, which engages in a recess 24, in particular a bore, an elongated hole, a square hole or a rectangular hole in a joint rod 25, which is connected to the first structural component 12 or the second structural component 13.

Figure 13:
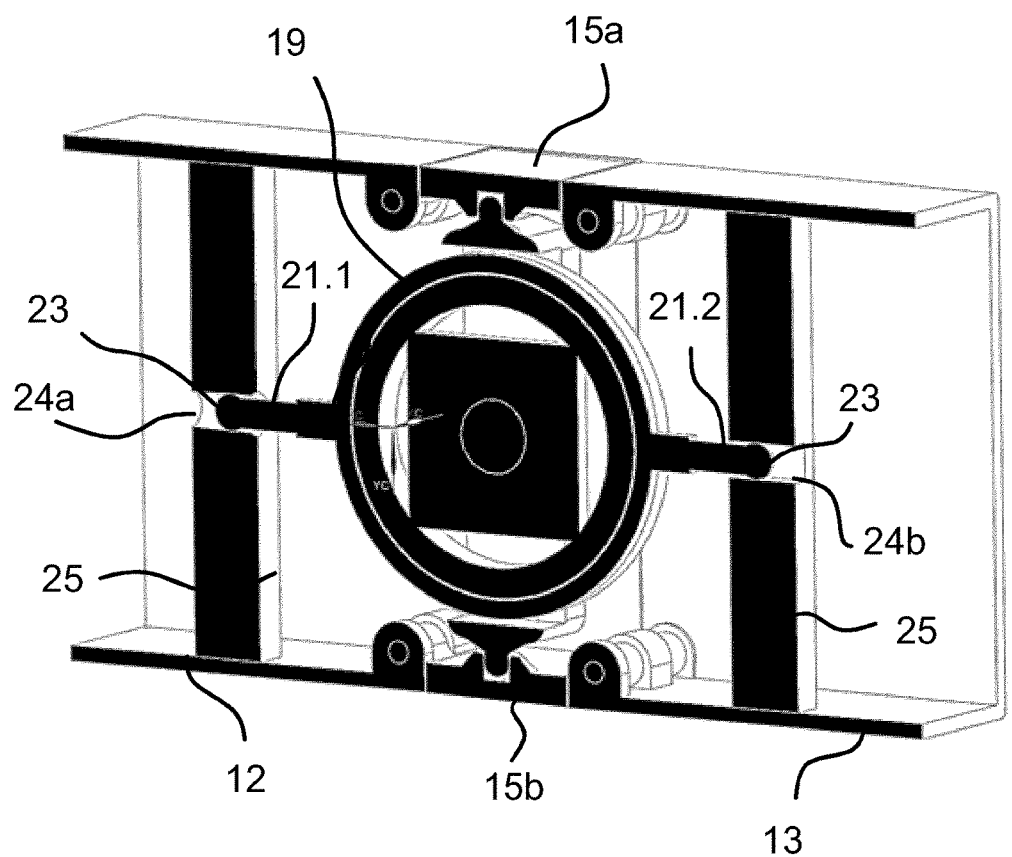
FIG. 13 is a perspective sectional view of a variant of a joint with a torque sensor, which comprises levers with ball head pins.
Figure 14:
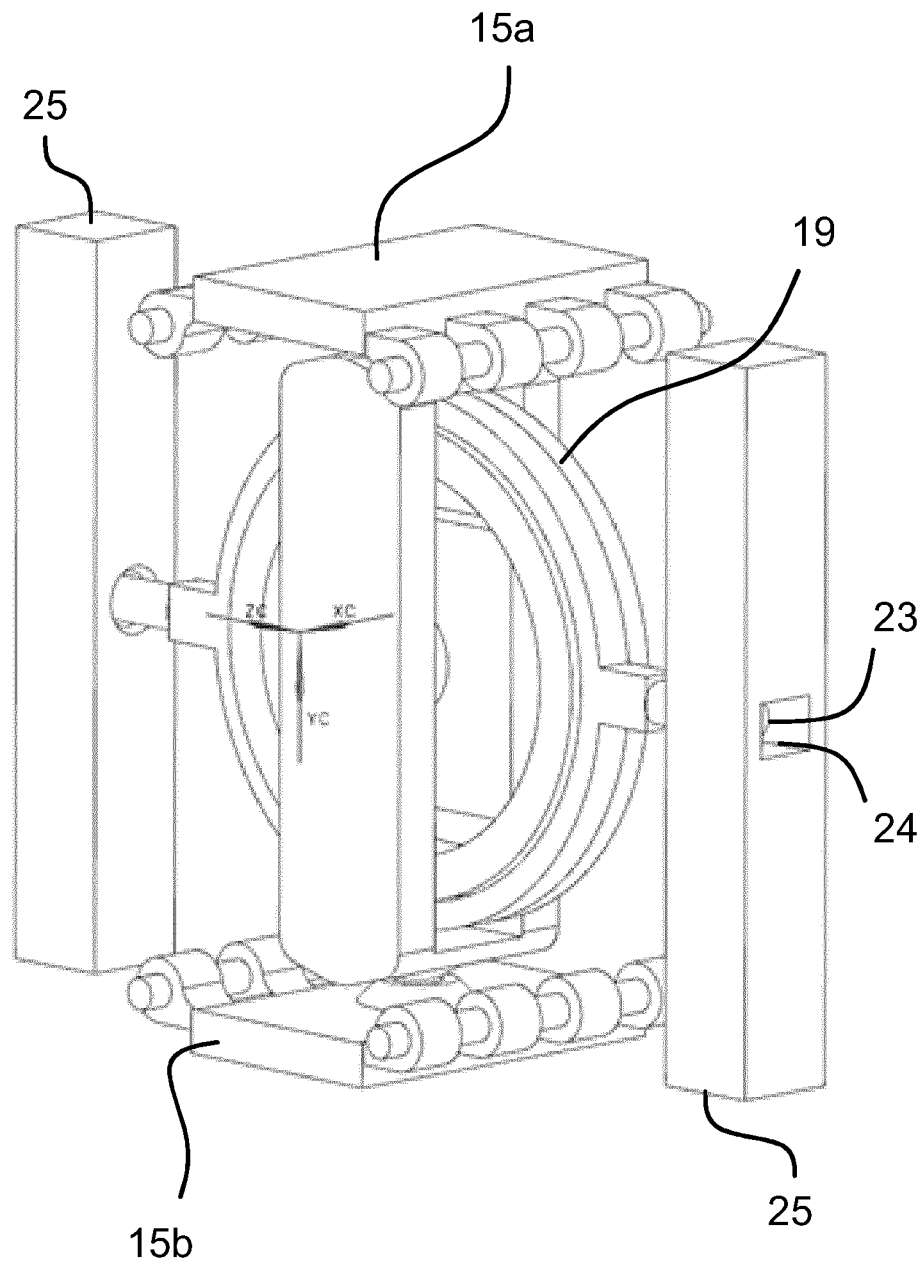
FIG. 14 is a perspective representation of the joint according to FIG. 13.
Figure 15:
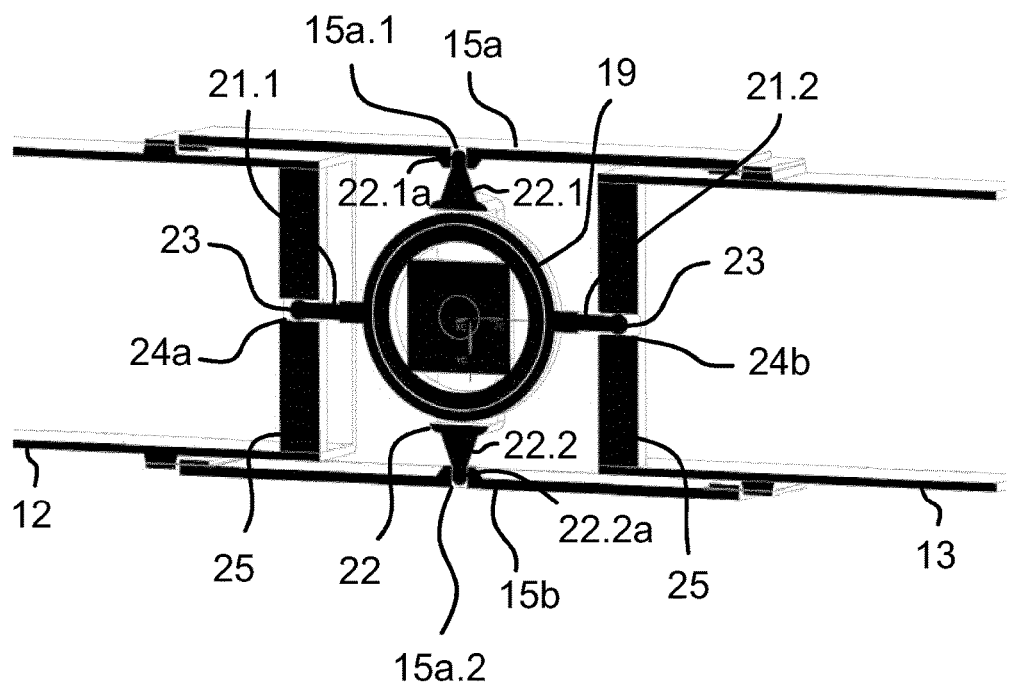
FIG. 15 is a perspective sectional view of an alternative joint with elongated swing arms, short bending elements and stops.
Figure 16:
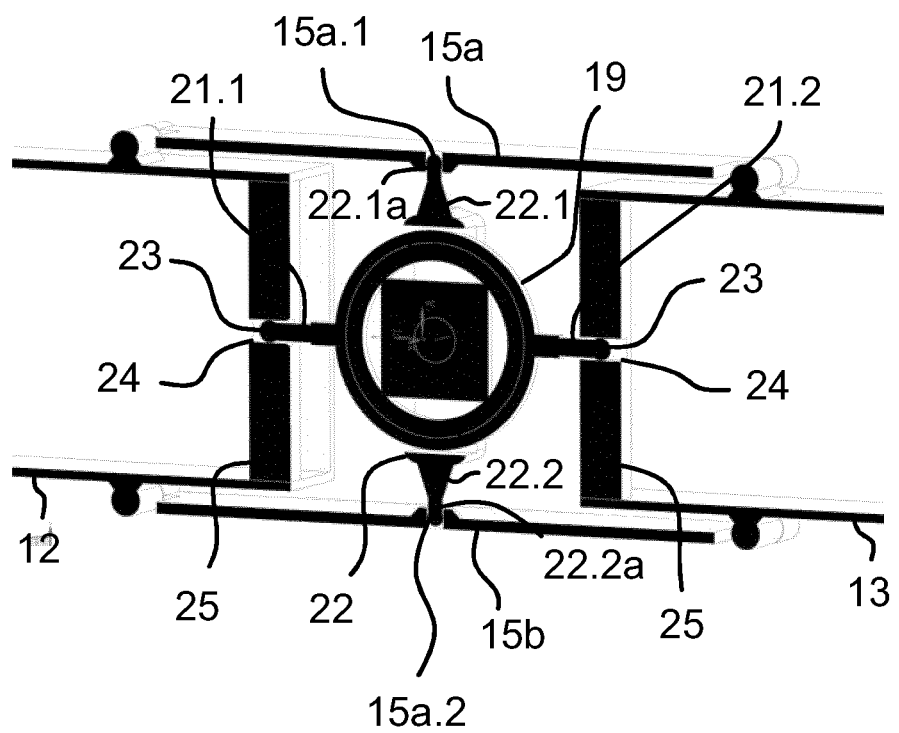
FIG. 16 is a perspective sectional view of an alternative joint with elongated swing arms, rotary joints (prismatic joint) and stops.

FIG. 13 shows how the sensor can be mounted in a transverse force-decoupled manner. As shown in FIG. 4, the intermediate segment is decisively guided on a straight line perpendicular to the straight lines of the distance A by the guide in the swing arms, and can rotate and be displaced in a linear manner on said straight line. The one lever of the outer ring of the sensor is held in four force directions, i.e. from above, from below, from the front and from the rear, and the other lever is held in two force directions, i.e. from above and from below.

Figure 17:
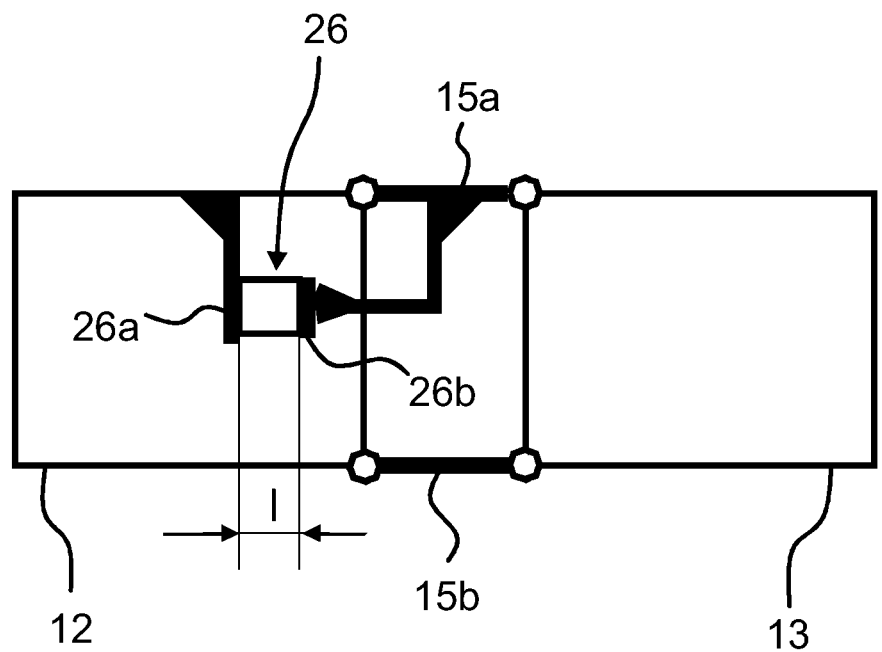
FIG. 17 is a schematic representation of a one-dimensional force measuring device, which is coupled between the first structural component and a swing arm.
Figure 18:
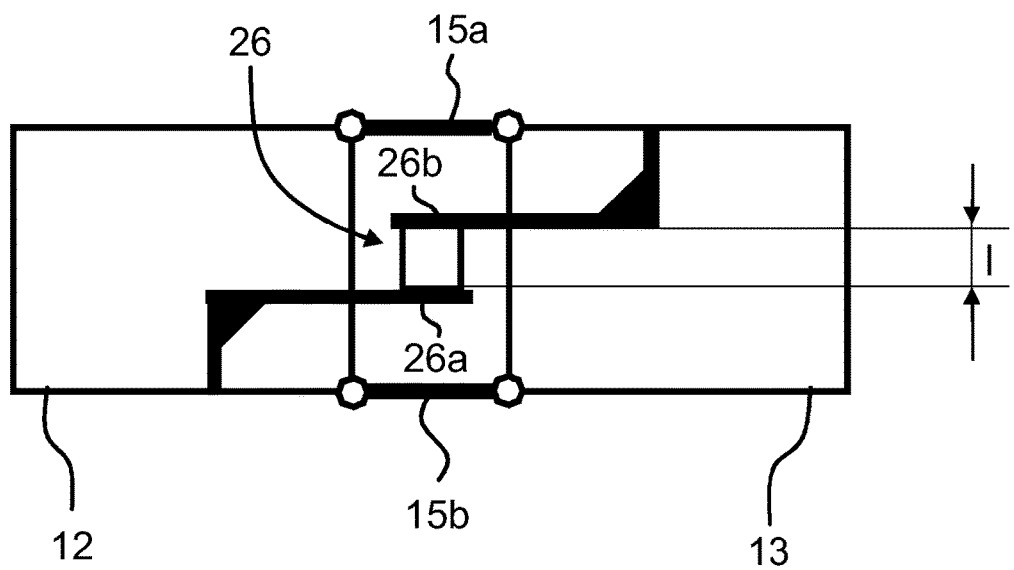
FIG. 18 is a schematic representation of a one-dimensional force measuring device, which is coupled between the first structural component and the second structural component for force measurement in the transverse direction.
Figure 19:
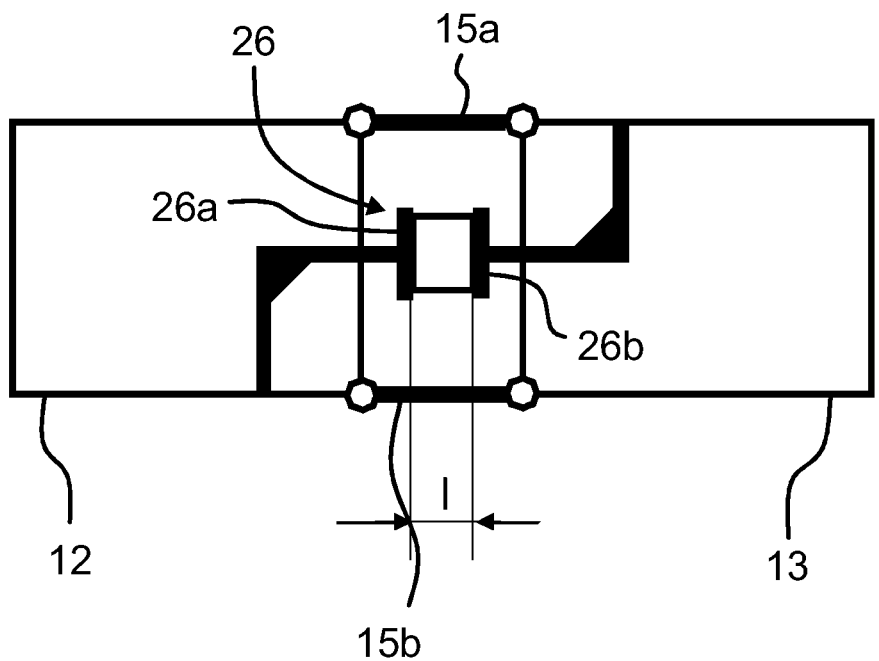
FIG. 19 is a schematic representation of a one-dimensional force measuring device, which is coupled between the first structural component and the second structural component for force measurement in the longitudinal direction.

As shown in the variants according to FIG. 17 to FIG. 19, the force measuring device 14 can comprise a force sensor 26 instead of a torque sensor 17.

In the variant according to FIG. 17, the force measuring device 14 comprises a force sensor 26, which comprises a first sensor flange 26a connected to the first structural component 12, and a second sensor flange 26b connected to the first four-bar link 15a.

In the variant according to FIG. 18, the force measuring device 14 comprises a force sensor 26, which comprises a first sensor flange 26a connected to the first structural component 12, and a second sensor flange 26b connected to the second structural component 13, wherein the force sensor 26 is coupled in transverse direction for force measurement.

In the variant according to FIG. 19, the force measuring device 14 comprises a force sensor 26, which comprises a first sensor flange 26a connected to the first structural component 12, and a second sensor flange 26b connected to the second structural component 13, wherein the force sensor 26 is coupled in longitudinal direction for force measurement.

Figure 20:
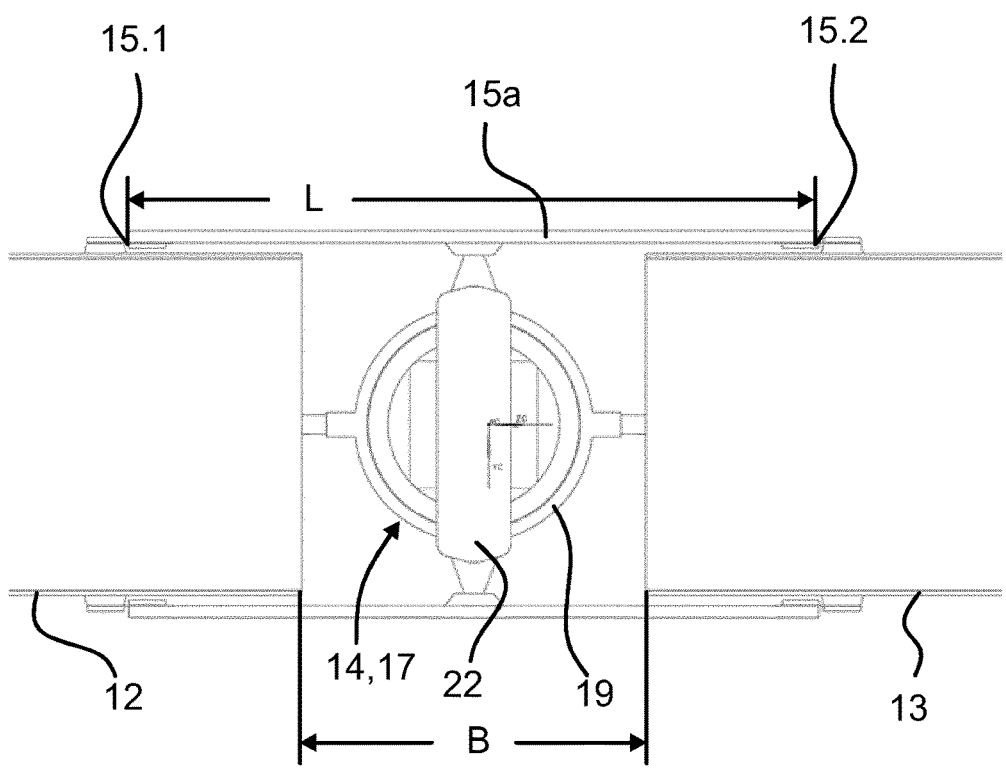
FIG. 20 is a sectional view of an alternative joint with elongated swing arms, short bending elements and stops.

As is shown in particular in FIG. 20, the first four-bar link 15a and the second four-bar link 15b each comprise a length L in the longitudinal extension of the link L1-L7 of the robot arm 2, which is greater than the distance B between the first structural component 12 and the second structural component 13, within which distance B the force measuring device 14, in particular the torque sensor 17, is disposed.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot, comprising:
    a robot controller designed and configured to execute a robot program;
    a robot arm with at least three joints which are connected by links; and
    a plurality of drives corresponding to each of the at least three joints, wherein each drive is configured to adjust one of the joints allocated to the drive, and which can be actuated in an automated manner in accordance with the robot program or in a manual drive mode by the robot controller in order to automatically adjust the associated joint;
    at least a first one of the links comprising:
        a force measuring device configured to measure a force on the first link in a predetermined direction,
        a first structural component which is connected to the joint of the robot arm that is mounted in the kinematic joint chain of the robot arm directly upstream from the first link, a second structural component which is connected to the joint of the robot arm that is mounted in the kinematic joint chain of the robot arm directly downstream from the first link, and a bearing arrangement connecting the first structural component to the second structural component and which is configured to rigidly connect the first structural component to the second structural component, leaving only one degree of freedom, wherein the one degree of freedom of the bearing is configured to permit mobility only in the direction in which the force measuring device is configured to measure the force.

2. The robot of claim 1, wherein the bearing arrangement is configured to permit a displacement of the first structural component relative to the second structural component.

3. The robot of claim 2, wherein the bearing arrangement is configured to permit a displacement of the first structural component relative to the second structural component in a direction perpendicular to a straight line extending in the kinematic joint chain of the robot arm from the upstream joint to the downstream joint.

4. The robot of claim 3, wherein the bearing arrangement includes a four-bar linkage, the four-bar linkage comprising:
   a first four-bar link with a first input joint and a first output joint; and
   a second four-bar link with a second input joint and a second output joint;
   wherein the first input joint and the second input joint are connected to the first structural component, and the first output joint and the second output joint are connected to the second structural component.

5. The robot of claim 4, wherein joints of the four-bar linkage are bending joints configured to permit only a displacement of the first structural component relative to the second structural component in a direction perpendicular to a straight line in the kinematic joint chain of the robot arm extending from the upstream joint to the downstream joint, and to prevent a rotation of the first structural component relative to the second structural component.

6. The robot of claim 5, wherein at least one of:
   the first input joint, the first output joint, the second input joint, and the second output joint are bending joints; or
   the bending joints prevent a rotation of the first structural component relative to the second structural component about a rotational axis parallel to the straight line in the kinematic joint chain of the robot arm extending from the upstream joint to the downstream joint.

7. The robot of claim 4, wherein the first four-bar link and the second four-bar link respectively comprise a length in the longitudinal extension of the link of the robot arm which is greater than the distance between the first structural component and the second structural component, within which distance the force measuring device is arranged.

8. The robot of claim 7, wherein the force measuring device is a torque sensor having a mounting flange and a lever, and at least one of the mounting flange or the lever is arranged within the distance between the first structural component and the second structural component.

9. The robot of claim 7, wherein the force measuring device is a torque sensor wherein:
   the torque sensor comprises an inner flange, which is connected to an intermediate segment that is coupled to the first structural component via a first four-bar linkage and is coupled to the second structural component via a second four-bar linkage; and
   the torque sensor comprises an outer flange, which includes first and second levers, wherein the first lever is connected to the first structural component and the second lever is connected to the second structural component.

10. The robot of claim 7, wherein the force measuring device is a torque sensor wherein:
   the torque sensor comprises an outer flange which is connected to an intermediate segment that is coupled to the first structural component via a first four-bar linkage and is coupled to the second structural component via a second four-bar linkage; and
   the torque sensor comprises an inner flange which includes first and second levers, wherein the first lever is connected to the first structural component and the second lever is connected to the second structural component.

11. The robot of claim 9, wherein the force measuring device comprises a force sensor, the force sensor comprising:
   a first sensor flange connected to the first structural component or to the second structural component; and
   a second sensor flange connected to the first four-bar link or to the second four-bar link;
   wherein the first and second sensor flanges are configured to move in a measuring direction of the interposed force measuring device when a force is applied to the first structural component or to the second structural component in the measuring direction that results in a displacement of at least one of the first structural component or the second structural component in the measuring direction.

12. The robot according of claim 9, wherein the force measuring device comprises a force sensor, the force sensor comprising:
   a first sensor flange connected to the first structural component; and
   a second sensor flange connected to the second structural component;
   wherein the first and second sensor flanges are configured to move in a measuring direction of the interposed force measuring device when a force is applied to the first structural component or to the second structural component in the measuring direction that results in a displacement of at least one of the first structural component or the second structural component in the measuring direction.

13. The robot according of claim 9, wherein at least one of:
   (a) the first four-bar linkage comprises a first recess which is square or circular in cross-section, the first recess including a pair of two respective opposite inner walls, and
      the intermediate segment comprises a first leg which holds a first ball head, the first ball head inserted in the first recess in such a way that the one pair of opposite inner walls guides the first ball head in a first direction and the other pair of opposite inner walls guides the first ball head in a second direction perpendicular to the first direction, the first and second directions arranged perpendicular to the predetermined direction in which the force measuring device measures the force on at least one of the link; or
   (b) the second four-bar linkage comprises a second recess which is square or circular in cross-section with a pair of two respective opposite inner walls, and the intermediate segment comprises a second leg which holds a second ball head, the second ball head is inserted in the second recess in such a way that the one pair of opposite inner walls guides the second ball head in a first direction and the other pair of opposite inner walls guides the second ball head in a second direction perpendicular to the first direction, the first and second directions arranged perpendicular to the predetermined direction in which the force measuring device measures the force on the link.

14. The robot of claim 9, wherein the torque sensor is mounted in a tension-free manner by at least one of the first lever, the second lever, the first leg, or the second leg in such a way that an external force acting on at least one of the first structural component or the second structural component results exclusively in a torsional load on the torque sensor.

15. The robot of claim 4, wherein the force measuring device comprises a torque sensor, the torque sensor comprising:
an inner flange;
an outer flange;
connecting webs which connect the inner flange to the outer flange and are provided with measuring sensors;
a first lever connected to the outer flange and to the first structural component; and
a second lever connected to the outer flange and to the second structural component.

16. The robot of claim 15, wherein the connecting webs are provided with strain measuring sensors.

17. The robot of claim 4, wherein the force measuring device comprises a torque sensor, the torque sensor comprising:
an inner flange;
an outer flange;
connecting webs which connect the inner flange to the outer flange and are provided with measuring sensors;
a first lever connected to the inner flange and to the first structural component; and
a second lever connected to the outer flange and to the second structural component.

18. The robot of claim 17, wherein the connecting webs are provided with strain measuring sensors.

19. The robot of claim 15, wherein:
the first lever comprises a pin which engages in a recess in the first structural part or in a first joint rod; and
the second lever comprises a pin which engages in a recess in the second structural part or in a second joint rod.

20. The robot of claim 19, wherein at least one of:
the pin of at least one of the first lever or the second lever is a ball head pin;
the recess engaged by the pin of the first lever is a square hole or bore; or
the recess engaged by the pin of the second lever is a rectangular hole.

21. The robot of claim 15, wherein:
the first lever comprises a pin which engages in a recess in the second structural part or in a second joint rod; and
the second lever comprises a pin which engages in a recess in the first structural part or in a first joint rod.

22. The robot of claim 21, wherein at least one of:
the pin of at least one of the first lever or the second lever is a ball head pin;
the recess engaged by the pin of the first lever is a square hole or bore; or
the recess engaged by the pin of the second lever is a rectangular hole.

23. The robot of claim 1, wherein the bearing arrangement is formed by the force measuring device.

* * * * *